United States Patent
Rosato et al.

(10) Patent No.: US 8,494,867 B2
(45) Date of Patent: *Jul. 23, 2013

(54) METHOD AND APPARATUS FOR MATCHING BUYERS AND SELLERS IN AN ANONYMOUS ONLINE MARKETPLACE

(75) Inventors: John Patrick Rosato, Saddle River, NJ (US); Peter Barrett Blessing, Monroe, NY (US); Robert Charles Caputo, Evanston, IL (US)

(73) Assignee: CS Technology, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/325,270

(22) Filed: Dec. 14, 2011

(65) Prior Publication Data
US 2012/0084107 A1 Apr. 5, 2012

Related U.S. Application Data

(63) Continuation of application No. 12/124,622, filed on May 21, 2008, now Pat. No. 8,095,377.

(60) Provisional application No. 60/939,185, filed on May 21, 2007.

(51) Int. Cl.
*G06Q 30/02* (2012.01)
*G06Q 10/10* (2012.01)
*G06Q 10/06* (2012.01)
*G06Q 30/06* (2012.01)
*G06Q 10/08* (2012.01)
*G07G 1/00* (2006.01)
*G07G 1/12* (2006.01)

(52) U.S. Cl.
USPC .......................................................... 705/1.1

(58) Field of Classification Search
None
See application file for complete search history.

(56) References Cited

U.S. PATENT DOCUMENTS

| 6,330,554 | B1 | 12/2001 | Altschuler et al. |
| 7,403,942 | B1 | 7/2008 | Bayliss |
| 2004/0225553 | A1* | 11/2004 | Broady et al. .................. 705/10 |

* cited by examiner

*Primary Examiner* — Jonathan Ouellette

(57) ABSTRACT

In one embodiment, the present invention is a method and apparatus for matching buyers and sellers in an anonymous online marketplace. One embodiment of a method for defining a community of network users includes collecting data relating to the network users, where the data is of at least one of the following types: demographic information relating to the network users, Internet Protocol address information relating to the network users, and Internet Protocol traffic information relating to the network users. The collected data is then anonymized, where the anonymizing is performed individually for each type of data. The anonymized data is aggregated to generate an activity-to-demographic mapping representative of network activity associated with particular demographics of the community of network users.

20 Claims, 4 Drawing Sheets

METHOD AND APPARATUS FOR MATCHING BUYERS AND SELLERS IN AN ANONYMOUS ONLINE MARKETPLACE

CROSS REFERENCE TO RELATED APPLICATIONS

This application is a continuation of U.S. patent application Ser. No. 12/124,622, filed May 21, 2008 now U.S. Pat. No. 8,095,377, which in turn claims the benefit of U.S. Provisional Patent Application Ser. No. 60/939,185, filed May 21, 2007. Both of these applications are herein incorporated by reference in their entireties.

FIELD OF THE INVENTION

The invention relates generally to electronic commerce ("e-commerce") and relates more particularly to the establishment of an electronic "marketplace" to match potential buyers and sellers. The invention also relates to the establishment of a value of and a marketplace for exchanging access to an aggregated and differentiable community of potential buyers.

BACKGROUND OF THE DISCLOSURE

The current art supports various methods to execute electronic search and commerce transactions, including on-line retailing and search engine sites that place potential vendors before potential buyers based on search criteria or advertisement sales. However, in the current art, the known characteristics of the potential buyers are rather limited (e.g., search keywords) and of only limited use to match potential business partners.

In some arrangements, search engines require login accounts so that users can enter their own demographic data or search preferences. However, such implementations then depend on personal data being stored by the search engine provider, and users can choose to describe themselves inaccurately. Thus, the searchers are not anonymous, and they may not truly match the characteristics desired by the potential business partners. Furthermore, there are currently no means for a community (e.g., an enterprise) to present its aggregated community as a buying bloc to potential on-line business partners.

Thus, there is a need in the art for a method and apparatus for matching buyers and sellers in an anonymous online marketplace.

SUMMARY OF THE INVENTION

In one embodiment, the present invention is a method and apparatus for matching buyers and sellers in an anonymous online marketplace. One embodiment of a method for defining a community of network users includes collecting data relating to the network users, where the data is of at least one of the following types: demographic information relating to the network users, Internet Protocol address information relating to the network users, and Internet Protocol traffic information relating to the network users. The collected data is then anonymized, where the anonymizing is performed individually for each type of data. The anonymized data is aggregated to generate an activity-to-demographic mapping representative of network activity associated with particular demographics of the community of network users.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one embodiment, the present invention is a method and apparatus for matching buyers and sellers in an anonymous online marketplace. Embodiments of the present invention utilize direct interaction with e-commerce sites and/or search engines to research and locate appropriate information, goods and services. More specifically, embodiments of the present invention create a means to anonymously match searchers (e.g., potential buyers) with potential business partners (e.g., sellers) using an embedded intelligence that employs a profile of the searcher to select appropriate business partners. By determining, aggregating, and storing characteristics of the searcher (e.g., income level, title, location) within distinct, well-defined Network user communities, the present invention can determine which business partners are most likely to offer products of relevance or interest to the searcher.

Further embodiments of the present invention permit the differentiation of an aggregated Network user community (e.g., a buying bloc) based on a number of demographic dimensions. Even further embodiments of the present invention create a marketplace by which values are established for access to the Network user community.

In one embodiment, distinct Network user communities are defined as aggregations of enterprises and further designate the enterprises' respective employees as members of these distinct Network user communities. One embodiment of a method for defining such Network user communities is described in greater detail with respect to FIG. 2. An Network user community thus defined will provide substantial demographic surety of the user base while respecting anti-trust and/or privacy concerns during the identification and categorization of the community demographics. Using the anonymous matching intelligence of the present invention, it is possible for search applications, including search engine websites, to provide preferential placement for advertisements for and/or links to business partners anxious to reach the particular demographic to which a potential searcher belongs.

Figure 1:
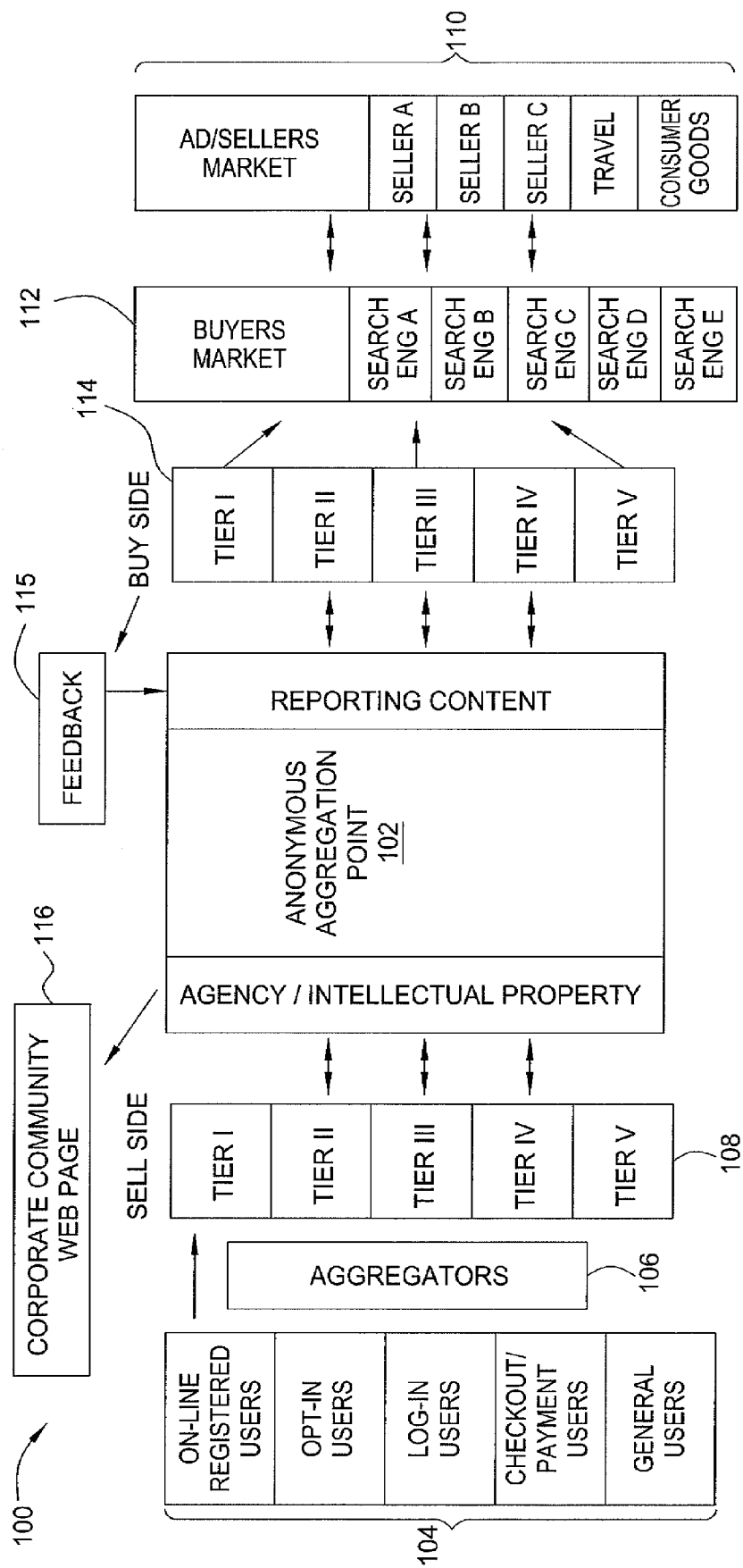
FIG. 1 is a schematic diagram illustrating a first embodiment of a system for matching buyers and sellers in an anonymous online marketplace, according to the present invention.

FIG. 1 is a schematic diagram illustrating a first embodiment of a system 100 for matching buyers and sellers in an anonymous online marketplace, according to the present invention. Specifically, the system 100 comprises a market, or exchange, for selling access to particular "potential buyer"

communities or segments of those communities. In one embodiment, the system 100 generally comprises a "sell side" and a "buy side". Generally, the sell side relates to users or potential buyers in the system 100, while the buy side relates to advertisers and/or sellers wishing to engage in business transactions with certain groups of potential buyers. An anonymous aggregation point 102 arbitrates between sell side user descriptors and buy side characteristics requested by potential sellers, advertisers, or intermediaries, as discussed in greater detail below.

Referring to the sell side, an Network user community 104 represents a base of potential buyers. In one embodiment, the network user community 104 comprises at least one of: online registered users, opt-in users, log-in users, checkout/payment users, and general users. Descriptive information to be associated with these anonymous users is provided by third party aggregators 106. In one embodiment, aggregators comprise at least one of: credit agencies, authorization agencies, telecommunications carriers, wireless carriers, and business incorporations or business employers. The taxonomy of users is represented by a first set of tiers 108 that group users by one or more of a variety of dimensions. In one embodiment, these dimensions include, but are not limited to: income, credit-worthiness, education, location, job function, sex, age, and bandwidth capabilities (e.g., an individual's access inclusive of size or amount of bandwidth, type of connection, time with access, content restrictions, etc.).

Optionally, the sell side further comprises a community web page 116 that functions as an interface for presenting opportunities to the network user community 104 based on offers aggregated and sorted at the anonymous aggregation point 102.

Referring to the buy side, advertisers or sellers participate in the system 100 through an advertisers/sellers market 110. The advertisers or sellers 110 are the actual sellers who are prepared to sell products to the network user community 104. In one embodiment, the advertisers or sellers 110 have arrangements with a buyer's market 112 to pay for referrals (e.g., "clicks") of users who belong to one or more of the tiers 108. In one embodiment, the payment for referrals varies in accordance with the tier 1086 from which users are referred.

The buyers market 112 comprises search engines or other web sites that represent "meeting places" between users (potential buyers) and the advertisers or sellers. These sites receive the tier classification data associated with the network user community 104 (e.g., via the anonymous aggregation point 102) and return to the users (e.g., via the anonymous aggregation point 102) specific content designed for their respective tiers 108 (e.g., advertisements for or links to sellers who are targeting income groups associated with one or more of the tiers 106). Thus, the buyers market 112 embodies intelligence that matches users with advertisers or sellers.

Targeted advertising and other content that is customized for the first set of tiers 108 (representing users) is represented as a corresponding second set of tiers 114. Service providers on the sell side of the system 100 have knowledge regarding the definition of the second set of tiers 114, so the service providers may devise sales, advertising, and presentation strategies for the respective tiers 114.

The buy side further comprises a feedback module 118 that performs one or more functions for facilitating sales and/or providing advertising effectiveness feedback. In one embodiment, the feedback module includes one or more of the following functions: demo tracking, click counting, and secure checkout. In one embodiment, these functions are available to complete transactions between buyer and seller and/or to allow data collection (e.g., click counts) that allows advertising effectiveness to be measured or fees to be determined and/or collected.

The system 100 may be implemented to execute a plurality of different transactions that provide value to an enterprise that defines its network user community. This value may be driven, at least in part, by the level of user participation. Rights may be optioned to allow for future consideration or return to investors in the system 100. At least some of the value may be distributed back to the network user community 104 (e.g., as a dividend or as a fund). In one embodiment, value is distributed to the network user community 104 in accordance with the tiers 108 with which the users are associated.

In addition, a plurality of additional services may be provided to buyers and sellers who participate in the system 100. In one embodiment, these services include one or more of: advisory services (e.g., user community valuation, discovery, negotiation, development, management, branding, affinity, etc.), asset/intellectual property management services (e.g., tracking, demographics, data management, update, valuation, software, etc.), and investment services (e.g., derivatives, hedge, strategy, distribution, actuarial, options, bond products, annuities, sales tracking, etc.). For example, advertisers or sellers participating in the buyers market 112 may want sales tracking data so that they can better assign a value to the "clicks" from users in certain tiers 108. Such data may also allow advertisers or sellers to determine better rates for their clients.

Figure 2:
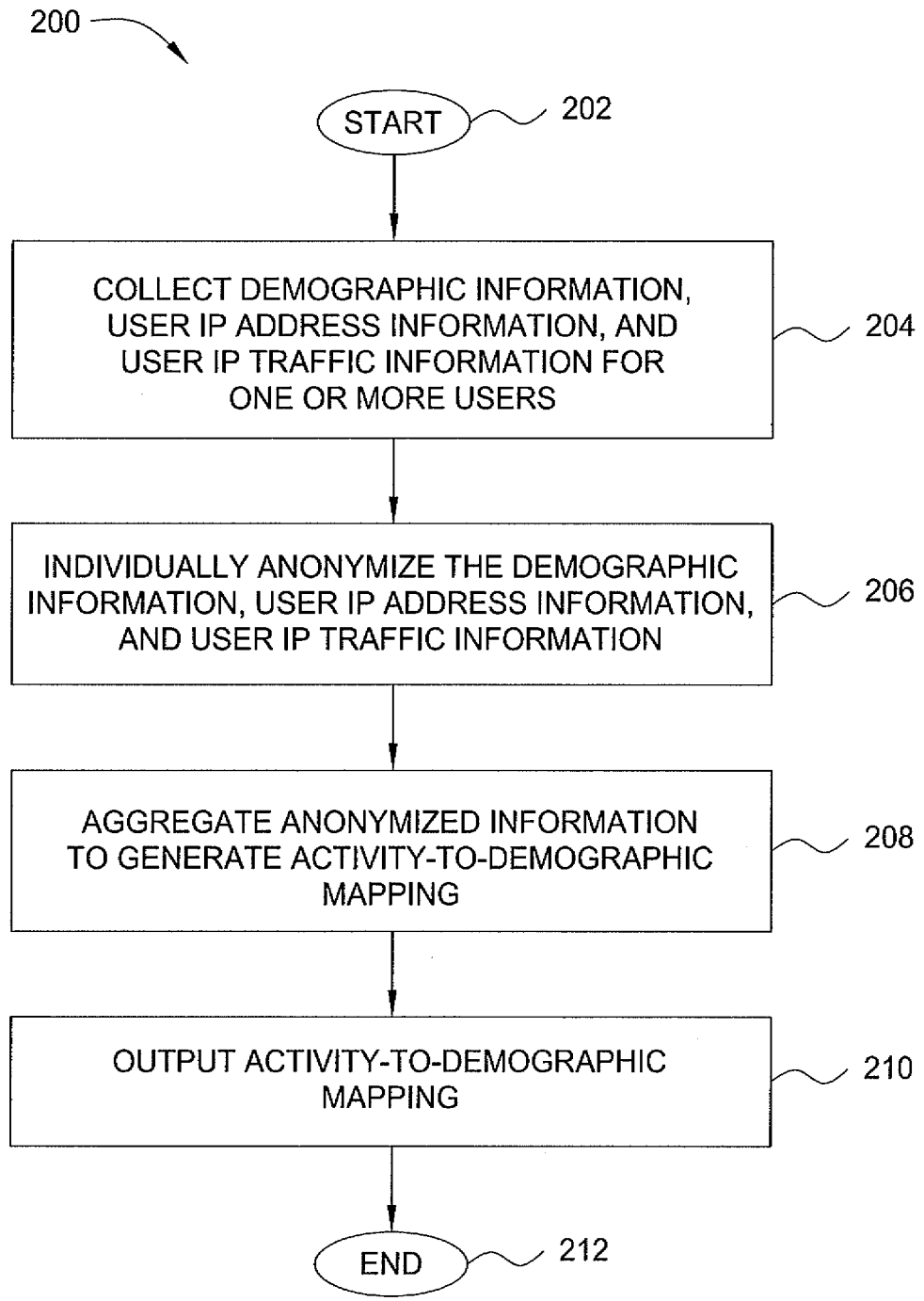
FIG. 2 is a flow diagram illustrating one embodiment of a method for providing user information to a system for matching buyers and sellers, such as the system illustrated in FIG. 1, according to the present invention.

FIG. 2 is a flow diagram illustrating one embodiment of a method 200 for defining a network user community, according to the present invention. Specifically, the method 200 defines a network user community in accordance with the records of a corporate Internet Protocol (IP) network. The method 200 may be implemented, for example, at the anonymous aggregation point 102 of the system 100. In one embodiment, the method 200 provides information about users of a corporate IP network, where the corporate IP network includes a plurality of potential data sources, including at least one of: a human resources (HR) system, an IP address management system, and one or more Internet access points.

The method 200 is initialized in step 202 and proceeds to step 204, where the method 200 collects information about individual users of the corporate IP network. In one embodiment, the collected information comprises at least one of: demographic information (e.g., collected from the HR system), user IP address information (e.g., collected from the IP address management system), and user IP traffic information (e.g., collected from the Internet access point(s)).

In one embodiment, demographic information about a user of the corporate IP network that is maintained by the HR system includes at least one of: username, location, job title, sex, and age. In one embodiment, user IP address information includes IP addresses and the username to which IP address is assigned (user IP addresses are typically unique to individual users of the corporate IP network, and in many cases are assigned by the IP address management system). The IP address management system retains logs of IP addresses and associated usernames. In one embodiment, these logs are periodically dumped to an external server. In one embodiment, user IP traffic information includes the World Wide Web sites accessed by users of the corporate IP networks and the usernames (and/or internal IP addresses) associated with the accessed sites. World Wide Web access is provided to users of the corporate IP network by the Internet access point(s). An Internet access point is typically divided into multiple modules or channels that handle different types of functions (e.g., web browsing, email, partner connectivity, etc.). A web browsing module will typically contain a combination of firewalls, content filters, virus scanners, proxy servers and other security or traffic management devices. The device(s) that controls user access typically logs user traffic by IP address and/or username. In one embodiment, outbound requests flowing through the Internet access point are also tagged with user demographic information that can be recognized by the system 100. In one embodiment, the tagging mechanism is one or more of: appendages to search strings, external source IP address assignment, cookie manipulation, uniform resource locator (URL) modification, or hypertext transfer protocol (HTTP) packet manipulation.

Having collected the appropriate information, the method 200 proceeds to step 206 and individually anonymizes the demographic information, the user IP address information, and user IP traffic information. Any anonymization technique that substantially obscures the specific characteristics of the associated corporate IP network user may be implemented in accordance with step 206. For instance, in one embodiment, the demographic information is anonymized using a one-way hash of the username. Because the raw form of the collected information is retained at its source(s) (e.g., in a corporate HR system, an IP address management system, or an Internet access point), the users' specific characteristics are never available to search engines or other applications beyond the source, where the characteristics already reside.

In step 208, the method 200 aggregates and correlates the anonymized information from the HR system, the IP address management systems, and the Internet access points(s). This aggregation and correlation generates an activity-to-demographic mapping that may be useful in categorizing corporate IP network users in accordance with one or more tiers 108 of the system 100. In one embodiment, step 208 employs a one-way anonymization technique, so that individual identities are secure. Correlation engine enables the method 200 to accurately link on-line activity to specific user demographics.

In step 210, the method 200 outputs the activity-to-demographic mapping before terminating in step 212.

In one embodiment, the steps of the method 200 are performed by one or more servers. For instance, one embodiment of the present invention includes at least one server for collecting the user information and at least one sever for aggregating and correlating the user information. Further embodiments of the present invention include one or more servers for performing demographic lookup and IP address lookup. One or more of these servers interacts with components of the corporate IP network infrastructure that maintain logs of user activity and information, such as Internet access routers (e.g., including internal firewalls, external firewalls, or local area network (LAN) switches), content filters, virus scanners, URL filters, proxy servers, and management and log servers.

Figure 3:
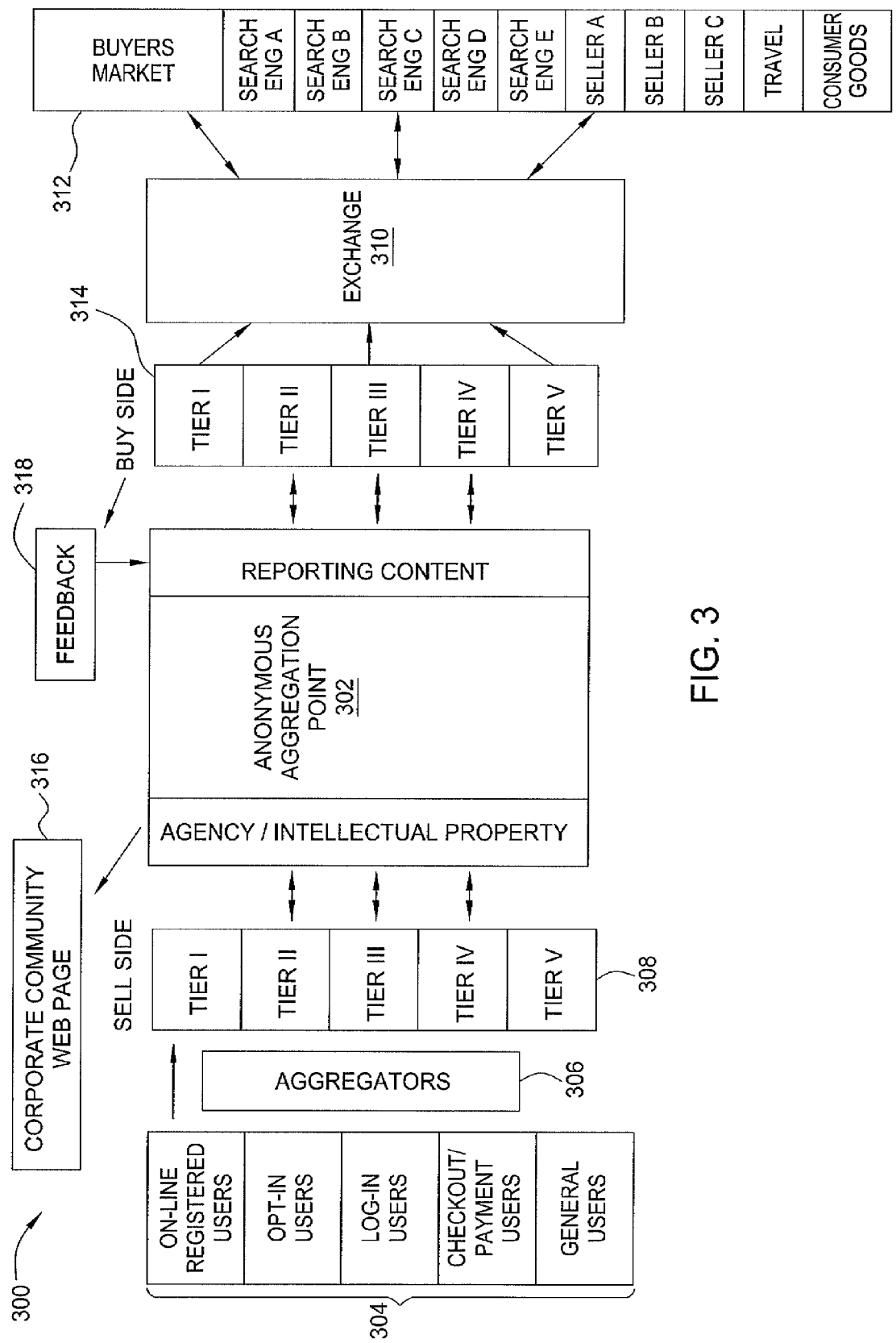
FIG. 3 is a schematic diagram illustrating a second embodiment of a system for matching buyers and sellers in an anonymous online marketplace, according to the present invention.

FIG. 3 is a schematic diagram illustrating a second embodiment of a system 300 for matching buyers and sellers in an anonymous online marketplace, according to the present invention. Similar to the system 100 illustrated in FIG. 1, the system 300 comprises a market, or exchange, for selling access to particular "potential buyer" communities or segments of those communities. In one embodiment, the system 300 generally comprises a "sell side" and a "buy side". Generally, the sell side relates to users or potential buyers in the system 300, while the buy side relates to advertisers and/or sellers wishing to engage in business transactions with certain groups of potential buyers. An anonymous aggregation point 302 arbitrates between sell side user descriptors and buy side characteristics requested by potential sellers, advertisers, or intermediaries, as discussed in greater detail below.

As in the system 100, a network user community 304 represents a base of potential buyers. In one embodiment, the network user community 304 comprises at least one of: online registered users, opt-in users, log-in users, checkout/payment users, and general users. Descriptive information to be associated with these anonymous users is provided by third-party aggregators 306. In one embodiment, aggregators comprise at least one of: credit agencies, authorization agencies, telecommunications carriers, wireless carriers, and business incorporations or business employers. The taxonomy of users is represented by a first set of tiers 308 that group users by one or more of a variety of dimensions. In one embodiment, these dimensions include, but are not limited to: income, creditworthiness, education, location, job function, sex, age, and bandwidth capabilities (e.g., an individual's access inclusive of size or amount of bandwidth, type of connection, time with access, content restrictions, etc.).

Optionally, the sell side further comprises a community web page 316 that functions as an interface for presenting opportunities to the network user community 304 based on offers aggregated and sorted at the anonymous aggregation point 302.

In contrast to the system 100, in which advertisers or sellers participate via an advertisers/sellers market, the system 300 includes an "exchange" 310, similar to a stock or commodities exchange. In this exchange 310, enterprises such as corporate entities can offer access to their user (potential buyer) communities, either in aggregate or by demographic "slice," to entities in the buyers market 312. In one embodiment, access is time-limited or specific to a product segment (e.g., automobiles). Using the exchange 310, the enterprise can seek strategies to maximize the value of its user community. Value can be realized in transactions within the exchange 310, and the income realized can be retained by the enterprise or shared with its user community. For example, an enterprise such as a brokerage firm could sell browsing access to its client (user) community to an on-line search engine, and the profits derived from sale of the browsing access could be divided among the firm's clients (e.g., deposited into the clients' client accounts as an additional benefit of doing business with the brokerage firm). Additionally, the clients would see an advantage to using the brokerage firm's browsing interface, because the results would be more targeted to their interests. In another example, browsing access could be sold directly to retailers, bypassing the search engine.

Targeted advertising and other content that is customized for the first set of tiers 308 (representing users) is represented as a corresponding second set of tiers 314. Service providers on the sell side of the system 300 have knowledge regarding the definition of the second set of tiers 314, so the service providers may devise sales, advertising, and presentation strategies for the respective tiers 314.

The buy side further comprises a feedback module 318 that performs one or more functions for facilitating sales and/or providing advertising effectiveness feedback. In one embodiment, the feedback module includes one or more of the following functions: demo tracking, click counting, and secure checkout. In one embodiment, these functions are available to complete transactions between buyer and seller and/or to allow data collection (e.g., click counts) that allows advertising effectiveness to be measured or fees to be determined and/or collected.

In a further embodiment, the system 300 allows users to self-identify with additional information of value that could be used to increase their "browsing value" (either individually or within a more selective and valuable demographic). This incremental value could also be realized in the exchange 310 and result in additional profits that could be returned to the enterprise and/or shared with users.

Figure 4:
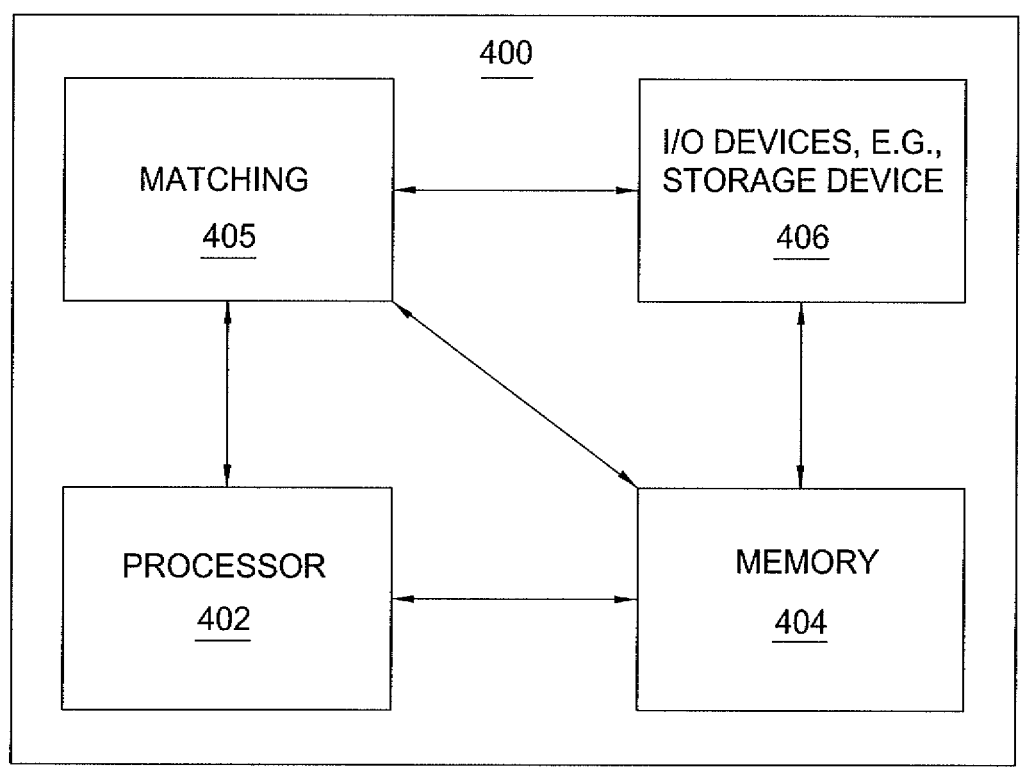
FIG. 4 is a high level block diagram of the present matching method that is implemented using a general purpose computing device.

FIG. 4 is a high level block diagram of the present matching method that is implemented using a general purpose computing device 400. In one embodiment, a general purpose computing device 400 comprises a processor 402, a memory 404, a matching module 405 and various input/output (I/O) devices 406 such as a display, a keyboard, a mouse, a modem, and the like. In one embodiment, at least one I/O device is a storage device (e.g., a disk drive, an optical disk drive, a floppy disk drive). It should be understood that the matching module 405 can be implemented as a physical device or subsystem that is coupled to a processor through a communication channel.

Alternatively, the matching module 405 can be represented by one or more software applications (or even a combination of software and hardware, e.g., using Application Specific Integrated Circuits (ASIC)), where the software is loaded from a storage medium (e.g., I/O devices 406) and operated by the processor 402 in the memory 404 of the general purpose computing device 400. Thus, in one embodiment, the matching module 405 for matching buyers and sellers in an anonymous online marketplace described herein with reference to the preceding Figures can be stored on a computer readable medium or carrier (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

While foregoing is directed to the preferred embodiment of the present invention, other and further embodiments of the invention may be devised without departing from the basic scope thereof.

What is claimed is:

1. A method for generating an activity-to-demographic mapping representative of network activity associated with particular demographics of a plurality of users of an enterprise network, the method comprising:
    collecting data relating to the plurality of users, where the plurality of users comprises employees of an enterprise associated with the enterprise network, and where the data comprises demographic information relating to the plurality of users and collected from a human resources system associated with the enterprise;
    anonymizing the data to generate anonymized data; and
    aggregating the anonymized data to generate the activity-to-demographic mapping,
    wherein at least one of the collecting, the anonymizing, or the aggregating is performed by a server.

2. The method of claim 1, where the anonymizing is performed individually for each type of data such that data specific to a given one of the plurality of users is unavailable to entities other than a source of the data.

3. The method of claim 1, wherein the demographic information comprises at least one of: a username used by an associated one of the plurality of users in the enterprise network, a location of an associated one of the plurality of users, a job title of an associated one of the plurality of users, a sex of an associated one of the plurality of users, or an age of an associated one of the plurality of users.

4. The method of claim 1, wherein the data further comprises Internet Protocol address information comprising at least one of: an Internet Protocol address of an associated one of the plurality of users or a username to which the Internet Protocol address is assigned in the enterprise network.

5. The method of claim 4, wherein the Internet Protocol address information is collected from an Internet Protocol address management system associated with the enterprise.

6. The method of claim 1, wherein the data further comprises Internet Protocol traffic information related to the plurality of users.

7. The method of claim 6, wherein the Internet Protocol traffic information comprises at least one of: one or more World Wide Web sites accessed by an associated one of the plurality of users, a username used by the associated one of the plurality of users to access the one or more World Wide Web sites, or an internal Internet Protocol address associated with the one or more World Wide Web sites.

8. The method of claim 6, wherein the Internet Protocol traffic information is collected from one or more Internet access points associated with the enterprise network.

9. The method of claim 8, wherein the Internet Protocol traffic information is tagged with at least a portion of the demographic information relating to at least one of the plurality of network users.

10. The method of claim 9, wherein a mechanism for performing tagging of the Internet Protocol traffic is at least one of: an appendage to a search string, an external source Internet Protocol address assignment, a manipulation of a cookie, a modification of a uniform resource locator, or a manipulation of a hypertext transfer protocol packet.

11. The method of claim 1, wherein the anonymizing comprises:
    applying a one-way hash function to at least a portion of the data.

12. The method of claim 1, further comprising:
    providing access to the activity-to-demographic mapping in exchange for compensation.

13. The method of claim 1, wherein the plurality of users further comprises other users of the enterprise network for whom the enterprise maintains demographic information.

14. A non-transitory computer readable storage medium containing an executable program for generating an activity-to-demographic mapping representative of network activity associated with particular demographics of a plurality of users of an enterprise network, where the program performs steps of:
    collecting data relating to the plurality of users, where the plurality of users comprises employees of an enterprise associated with the enterprise network, and where the data comprises demographic information relating to the plurality of users and collected from a human resources system associated with the enterprise;
    anonymizing the data to generate anonymized data; and
    aggregating the anonymized data to generate the activity-to-demographic mapping.

15. The non-transitory computer readable storage medium of claim 14, where the anonymizing is performed individually for each type of data such that data specific to a given one of the plurality of users is unavailable to entities other than a source of the data.

16. The non-transitory computer readable storage medium of claim 14, wherein the demographic information comprises at least one of: a username used by an associated one of the plurality of users in the enterprise network, a location of an associated one of the plurality of users, a job title of an associated one of the plurality of users, a sex of an associated one of the plurality of users, or an age of an associated one of the plurality of users.

17. The non-transitory computer readable storage medium of claim 14, wherein the data further comprises Internet Protocol address information comprising at least one of: an Internet Protocol address of an associated one of the plurality of users or a username to which the Internet Protocol address is assigned in the enterprise network.

18. The non-transitory computer readable storage medium of claim 14, wherein the data further comprises at least one of: one or more World Wide Web sites accessed by an associated one of the plurality of users, a username used by the associated one of the plurality of users to access the one or more World Wide Web sites, or an internal Internet Protocol address associated with the one or more World Wide Web sites.

19. The non-transitory computer readable storage medium of claim 14, wherein the plurality of users further comprises other users of the enterprise network for whom the enterprise maintains demographic information.

20. Apparatus for method for generating an activity-to-demographic mapping representative of network activity associated with particular demographics of a plurality of users of an enterprise network, the apparatus comprising:
    means for collecting data relating to the plurality of users, where the plurality of users comprises employees of an enterprise associated with the enterprise network, and where the data comprises demographic information relating to the plurality of users and collected from a human resources system associated with the enterprise;
    means for anonymizing the data to generate anonymized data; and
    means for aggregating the anonymized data to generate the activity-to-demographic mapping.

\* \* \* \* \*